United States Patent [19]

Idel

[11] 4,175,452
[45] Nov. 27, 1979

[54] MACHINE FOR THE MECHANICAL WORKING OF BAND SAWS

[75] Inventor: Vladimir V. Idel, Zakarpatskaya oblast, U.S.S.R.

[73] Assignee: Mukachevsky Stankostroitelny Zavod Imeni S.M. Kirova, U.S.S.R.

[21] Appl. No.: 773,752

[22] Filed: Mar. 2, 1977

[30] Foreign Application Priority Data

Mar. 30, 1976 [SU] U.S.S.R. .............................. 2333522
Mar. 30, 1976 [SU] U.S.S.R. .............................. 2333523

[51] Int. Cl.² ........................................... B23D 63/00
[52] U.S. Cl. ........................................... 76/25 R; 76/61
[58] Field of Search ............... 76/61, 58, 62, 63, 65, 76/66, 67, 112, 68, 25 R

[56] References Cited

U.S. PATENT DOCUMENTS

| 555,620 | 3/1896 | Salisbury | 76/66 |
| 3,630,103 | 12/1971 | Idel | 76/112 |

FOREIGN PATENT DOCUMENTS

413625 5/1946 Italy ............................................. 76/61

*Primary Examiner*—Robert L. Spruill
*Assistant Examiner*—Roscoe V. Parker, Jr.
*Attorney, Agent, or Firm*—Robert E. Burns; Emmanuel J. Lobato; Bruce L. Adams

[57] ABSTRACT

A method is disclosed wherein the teeth of a saw are set and, after setting a certain number of teeth and simultaneously with setting the last tooth, the saw blade is cut off and the cutting tool is withdrawn from the cutting zone before the saw is fed along the pitch. The machine includes a frame which carries an appliance for gripping the saw on the sides, a mechanism for the pitch feed of the saw, tooth-setting tools secured on the ends of the arms which are kinematically linked with a machine drive, and a pair of knives for cutting off the saw blade. The knives are located after the tooth-setting tools in the direction of pitch feed. One of these knives is secured on the saw-gripping appliance, while the other one is kinematically linked with one of the arms carrying the tooth-setting tool for joint movement with the latter. The machine provides for manufacturing saws with any required number of teeth.

4 Claims, 15 Drawing Figures

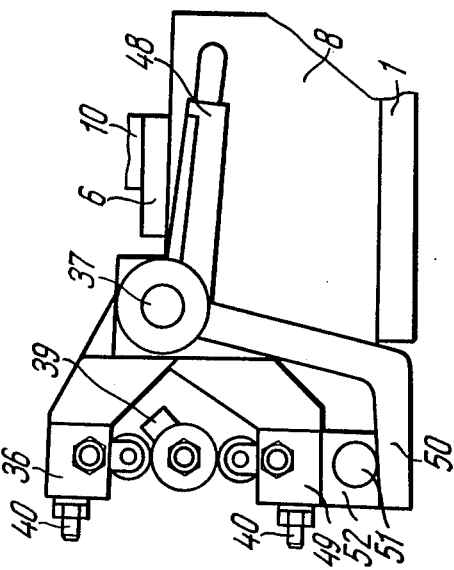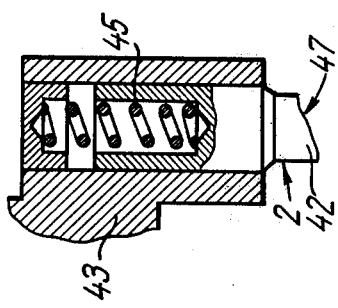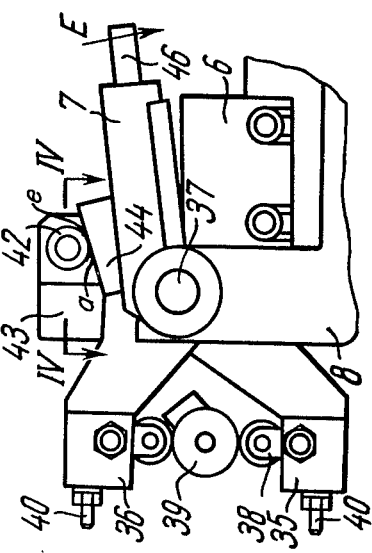

MACHINE FOR THE MECHANICAL WORKING OF BAND SAWS

BACKGROUND OF THE INVENTION

The present invention relates to mechanical working of metals and, more specifically, to a method of mechanical working of band saws, i.e. setting the saw teeth and cutting off its blade, and to the machines for the realization of the method.

Methods of mechanical working of band saws are well known in the art wherein the saw is first cut off at a desired length, then its teeth are set.

Cutting band saws at a predetermined length results in variations in the number of teeth in the same length. These variations are from 1 to 3%, which denies the possibility of automating the subsequent repair of the band saws, i.e. sharpening and setting the worn teeth.

In the known method, the saw blade is cut off and the teeth are set on separate machines, which decreases the output of the equipment due to the necessity of spending additional time for mounting and clamping the saw.

Besides, installation of separate machines for cutting off the saw and setting its teeth calls for extra floor space.

Machines are known for setting the saw teeth, and wherein the frame carries appliances for gripping the sides of the saw, i.e. its blade. This appliance has stops for the back side of the saw and for the points of its teeth, a mechanism for feeding the saw along the pitch, kinematically linked with the drive of the machine, and a tooth-setting mechanism, also kinematically linked with the drive.

The tooth-setting mechanism comprises tooth-setting tools, i.e. bending punches secured on the ends of arms. The arms are mounted on a common axle which is parallel to the pitch feed of the saw. The other ends of the arms are in constant contact with a camshaft kinematically linked with the drive of the machine.

The machines described above are intended for setting the saw teeth. The saw blades are cut off on separate machines, which calls for extra floor space and is thus highly undersirable.

SUMMARY OF THE INVENTION

It is an object of the present invention to provide a method of mechanical working of band saws and a machine for the realization of the method, which would allow setting the saw teeth and cutting off the blade of the saw simultaneously with setting its last tooth.

It is another object of the present invention to raise the efficiency of the method and machine.

Still another object is to reduce the floor space required for accommodation of the machine.

In accordance with these and other objects a method of mechanical working of band saws according to the invention consists in setting the teeth and cutting off the blade of the saw wherein first the saw teeth are set then, after setting a certain number of teeth and simultaneously with setting the last tooth, the saw blade is cut off and the cutting tool is withdrawn from the cutting zone before the saw is fed along the pitch.

This problem is also solved by providing a machine for mechanical working of band saws whose frame mounts an appliance for gripping the saw on its sides, a mechanism for pitch feeding the saw and tooth-setting tools secured on the ends of the arms installed on a common axle and linked kinematically with the drive of the machine. According to the invention, the machine comprises a pair of knives for cutting off the saw blade, located after the tooth-setting tools along the pitch feed of the saw. One of the knives is rigidly secured on the appliance for gripping the blade sides while the other one is kinematically linked with one of the arms carrying the tooth-setting tool for joint movement with it during the cutting off of the saw blade and for its withdrawal to the neutral position from the cutting zone after the blade has been cut off, before the pitch feed of the saw.

It is practicable that the other knife should be mounted on the axle of the arms carrying the tooth-setting tools with a provision for turning around it and that the kinematic chain connecting it with one of the arms should comprise a stop installed on one of the arms with a provision for being positively reciprocated along the pitch feed, and a wedge secured on the other knife and interacting with the surface of the stop which is parallel to the direction of movement of the stop.

Installation of the other knife on the arm axle and this form of its kinematic linkage with one of the arms makes it possible to set the other knife either automatically or manually to the initial position before cutting off the saw blade.

There should be a spring located between the face of the stop and one of the arms carrying the tooth setting tool, and intended for moving the stop.

The movement of the stop with the aid of a spring is the simplest solution from the standpoint of design.

It is possible to slant the face of the stop adjoining its surface which interacts with the wedge.

This form of the face makes it possible to move the stop directly by the other knife when the latter is being brought to the initial position.

It is also practicable that the other knife should be secured on its axle so that its cutting lip is essentially parallel with the axle installed on the second arm (along the pitch feed of the saw) which carries the tooth-setting tool and that the kinematic chain connecting the other knife with the second arm should comprise a gear mounted on the axle of the other knife and meshing with a rack installed on the rod which is mounted on the second arm with a provision for being positively reciprocated.

Such an installation of the other knife and its kinematic linkage with the second arm ensures automatic setting of the other knife to the initial position before cutting off the saw blade.

It is practicable that the other knife should be so secured on its axle that its cutting lip is essentially perpendicular to this axle installed on the second arm (along the pitch feed of the saw) and pressed flexibly against it and that the kinematic linkage of the other knife with the second arm should be constituted by a wedge joint one surface of which should be made on the axle of the other knife at an angle of its geometrical axis, the other surface being made on the part installed on the second arm with a provision for being positively reciprocated.

This installation of the other knife and its kinematic linkage with the second arm is most practicable for cutting off comparatively wide and thick saws.

It is also practicable that the kinematic chain connecting the other knife with the second arm (along the pitch feed of the saw) which carries the tooth-setting tool should comprise a gear rack made on that surface of the other knife which is opposite to its cutting lip, and a gear mounted on the second arm with a provision for being positively turned.

This kinematic chain orients the tooth space of the saw relative to the other knife.

It is quite feasible that the kinematic linkage of the other knife with the second arm, (along the pitch feed of the saw) which carries the tooth-setting tool, can be constituted by an additional arm whose end carries the other knife and the rotation axle of said arm is secured on the second arm (along the pitch feed of the saw), and by a wedge joint one surface of which is made on the additional arm while the other one, on a wedge installed on the second arm with a provision for being positively reciprocated relative thereto.

Such a kinematic linkage is noted for its compactness.

It is possible that the kinematic linkage of the other knife with the second arm (along the pitch feed of the saw) which carries the tooth-setting tool should be constituted by an additional arm one end of which carries the other knife and the rotation axle of said arm should be secured on the second arm across the pitch feed of the saw, the end of the arm carrying the other knife being spring-loaded while the other end should interact with a pusher installed on the second arm with a provision for being positively reciprocated.

Such a kinematic linkage is the simplest one from the viewpoint of design.

It is quite practicable that the kinematic linkage of the other knife with the second arm (along the pitch feed of the saw) which carries the tooth-setting tool should be made in the form of a cylinder whose free end carries the other knife while its other end is installed in the second arm with a provision for being positively turned around its own axle and secured in the arm against axial displacement.

It is possible that the kinematic linkage of the other knife with the second arm (along the pitch feed of the saw) which carries the tooth-setting tool is constituted by a cylinder whose free end carries the other knife while its other end is installed on the second arm with a provision for turning around its own axle and for limited axial displacement.

Such kinematic linkages are most practicable for cutting off comparatively narrow (6–15 mm) and thin (0.6 mm) saws.

The method of mechanical working of band saws and the machine for the realization thereof according to the present invention ensure a higher efficiency in mechanical working of saws, reduce the required production floor areas and, in addition, make it possible to produce band saws with a preset number of teeth which becomes particularly vital for their repairs in service, i.e. sharpening the blunted teeth and setting them to the required limits.

DESCRIPTION OF THE DRAWINGS

Now the invention will be described in detail by way of example with reference to the accompanying drawings, wherein:

FIG. 3 is a view along arrow A in FIG. 1, turned through 90°, an embodiment, in which the other knife is kinematically linked with the second arm;

FIG. 4 is a section view taken along section line IV—IV in FIG. 3, enlarged;

FIG. 5 is a view along arrow A in FIG. 1, turned through 90°, a version in which the other knife is linked kinematically with the first arm;

DESCRIPTION OF THE PREFERRED EMBODIMENTS

Figure 1:
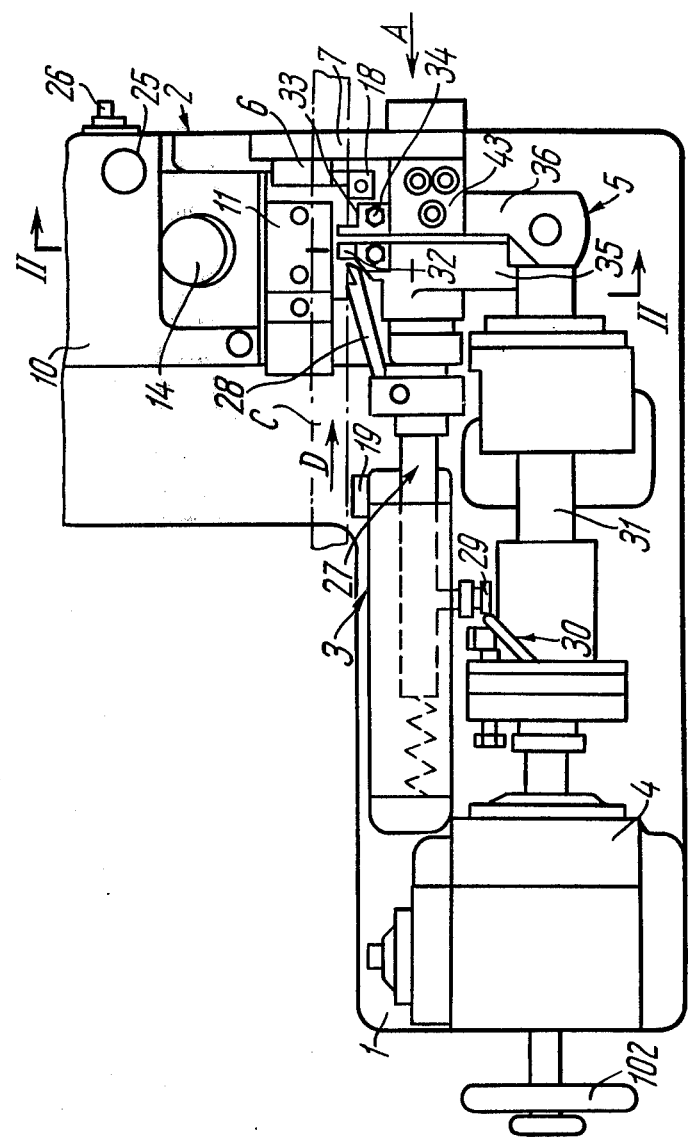
FIG. 1 is a schematic top view of a machine for mechanical working of band saws according to the invention.

The method of mechanical working of band saws according to the invention consists in that first, the teeth of the saw "C" (FIG. 1) are set and, after setting a predetermined number of teeth, and simultaneously with setting the last tooth, the saw blade is cut off after which the cutting tool is withdrawn from the cutting zone before feeding the saw along the pitch. The substance of the method will be dealt with in detail in the description of the operation of the machine for the realization of this method.

The machine for mechanical working of the band saw "C" comprises a frame 1 which mounts an appliance 2 for gripping the saw "C" on its sides, i.e. on the blade; a mechanism 3 for pitch feed of the saw "C" kinematically linked via a reduction unit 4 with the drive (not shown) of the machine; a mechanism for setting the teeth of the saw "C" kinematically linked via the reduction unit 4 with the drive of the machine; and a cutting tool, i.e. a pair of knives 6,7 for cutting off the saw blade.

Figure 2:
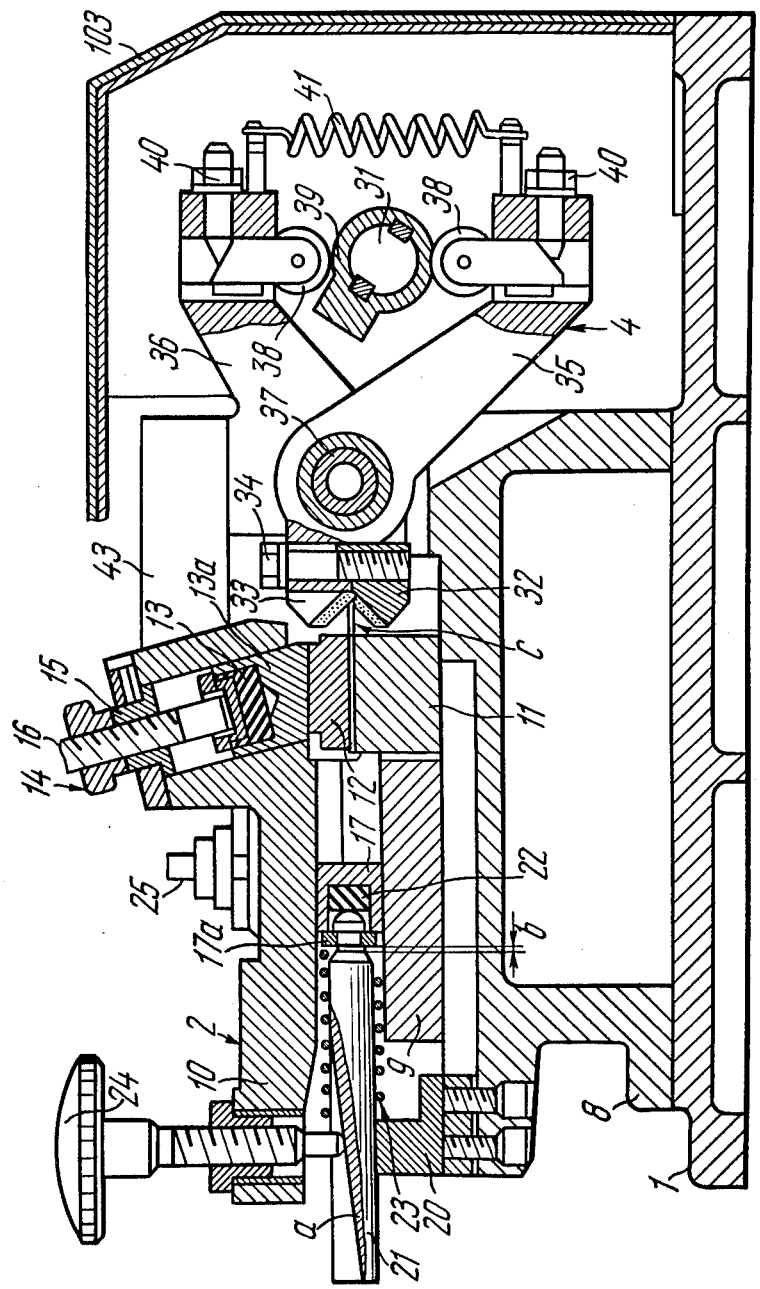
FIG. 2 is a section view taken along section line II—II in FIG. 1, enlarged.

The appliance 2 for gripping the sides of the saw "C" comprises a base 8 (FIG. 2) secured to which is a bar 9 serving as a guide for the cover 10.

One guide 11 for the saw "C" is fastened to the base 8 while the other guide 12 is installed on the cover 10 and connected via a shock absorber 13 with a retainer 14 which has the form of a nut 15 and screw 16. The nut 15 is rigidly fastened to the cover 10 whereas the screw 16 is connected to the guide 12 via the shock absorber 13 and a hold-down 13a. The retainer 14 presses the saw "C" against the guide 11.

The appliance 2 mounts a supporting element 17 for the back side of the saw "C" and supporting elements 18 (FIG. 1) for the points of its teeth. Another supporting element 19 for the tooth points of the saw is installed on the pitch feed mechanism 3. Secured to the back side of the base 8 (FIG. 2) is a bracket 20 in which is installed a shaft 21 with a longitudinal slot "a" set at an angle to the axis. At the side facing the supporting element 17 the shaft 21 has a spherical surface resting on a rubber shock absorber 22 located between the spherical surface and the supporting element 17. The shock absorber 22 compensates for any manufacturing inaccuracies of the saw across its width. The space of the supporting element 17 accommodating the spherical end of the shaft 17 is closed with a bar 17a. A clearance of 1–2 mm between the end of the shaft 21 and the bar 17a also compensates for the manufacturing inaccuracies of the saw "C" across its width.

Located on the shaft 21 between the bracket 20 and the bar 17a is a spring 23 intended to press the tooth points of the saw "C" against the supporting elements 18 (FIG. 1) and 19 in the course of laying the saw. The shaft 21 (FIG. 2) is fixed in the preset position by a retainer 24 constituted by a nut-and-screw pair.

The cover 10 is fixed by a retainer 25 mounted on the cover. Final clamping of the cover 10 is carried out with the aid of a handle 26 (FIG. 1) installed on said cover.

The pitch feed mechanism 3 of the saw "C" comprises a spring-loaded slide 27 provided with a pawl 28 engaging the saw teeth. The slide 27 is in constant contact via a roller 29 with a master form 30. The master form 30 is installed on a shaft 31 which is linked via a reduction unit 4 with the drive (not shown) of the machine.

The tooth-setting mechanism 5 of the machine comprises tools 32, 33—i.e. bending punches used for setting the saw teeth. These tools are secured by bolts 34 at one end of the arms 35 and 36.

The arm 35 is the first in the direction "D" of the pitch feed of the saw and is referred to hereinafter as the first arm whereas the arm 36 is the second in the direction "D" and is referred to below as the second arm.

The arms 35 and 36 are installed on a common axle 37 (FIG. 2) which is mounted on the base 8 parallel to the pitch feed of the saw "C". The other ends of the arms 35 and 36 carry rollers 38 which mesh alternately with the cam 39 secured on the shaft 31, the latter being linked with the machine drive via the reduction unit 4.

The rollers 38 are installed in the required positions by bolts 40. The other ends of the arms 35 and 36 are interconnected by a spring 41.

The mechanism for cutting off the saw comprises a pair of knives 6 (FIG. 1) and 7. The knives are located after the tooth-setting tools 32 and 33 in the direction "D" of pitch feed. The fixed knife 6 is rigidly secured on the base 8 (FIG. 2) of the saw gripping device 2. The other knife 7 (FIG. 1) is pivotally mounted on the axle 37 (FIG. 2) and is located after the arms 35 and 36 along the pitch feed direction. This axle is linked with the second arm 36 which carries the tooth-setting tool 33 for moving jointly with it during the cutting off of the saw and for withdrawing the other knife 7 from the cutting zone to the neutral position after cutting off the saw and before feeding of the saw along the pitch feed direction.

This kinematic chain comprises a stop 42 (FIGS. 3,4) installed in a bracket 43 rigidly secured on the end of the second arm 36 (FIG. 3) and a wedge 44 interacting with the stop and secured on the other knife 7. The stop 42 is installed in the bracket 43 with a provision for being reciprocated in the direction of the pitch feed by a spring 45 (FIG. 4) located between the face of the stop 42 and the bracket 43. The stop 42 interacts with the wedge 44 when the other knife 7 is positively pivoted around the axle 37. The other knife 7 is turned by a handle 46 secured thereon. The stop 42 interacts with the wedge 44 by its surface "a" which is parallel to the direction of movement of the stop and adjoins its free face. The free face has a slanted surface 47 directed along the turning of the other knife 7.

This slanted surface 47 ensures sliding of the other knife 7 past the stop when it is set to the initial position before cutting off the saw.

If necessary, the other knife 48 (FIG. 5) can be linked kinematically with the first arm 49 which carries the tooth-setting tool 32 and the fixed knife 6 can be secured on the cover 10 of the gripping device 2 (FIG. 1). The other knife 48 is kinematically linked with the first arm 49 by a part 50 rigidly connected with the other knife 48, and a stop 51 interacting with the part 50 and installed in the bracket 52 which is secured on the first arm 49. The stop 51 is similar to the stop 42 described above and illustrated in FIG. 4.

The other knife 7 (48) is turned to the initial position by hand before cutting off the saw, the drive of the machine being in an off condition.

Figure 8:
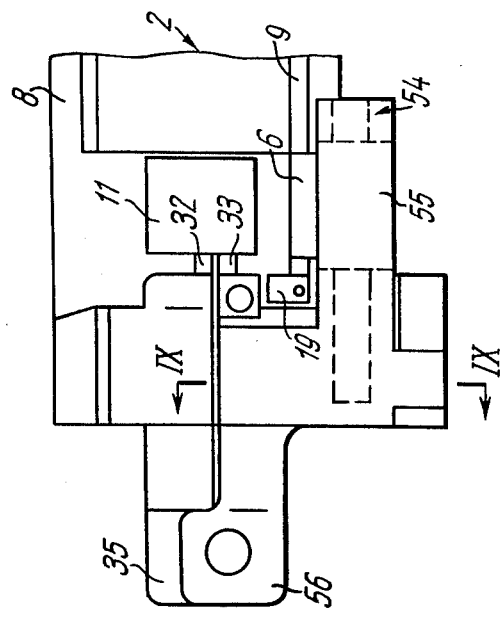
FIG. 8 is a view along arrow "B" in FIG. 6.
Figure 9:
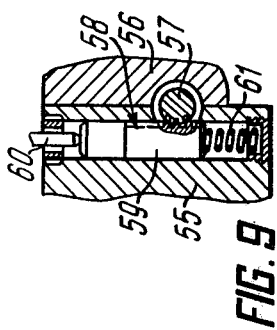
FIG. 9 is a section view taken along section line IX—IX in FIG. 8.
Figure 6:
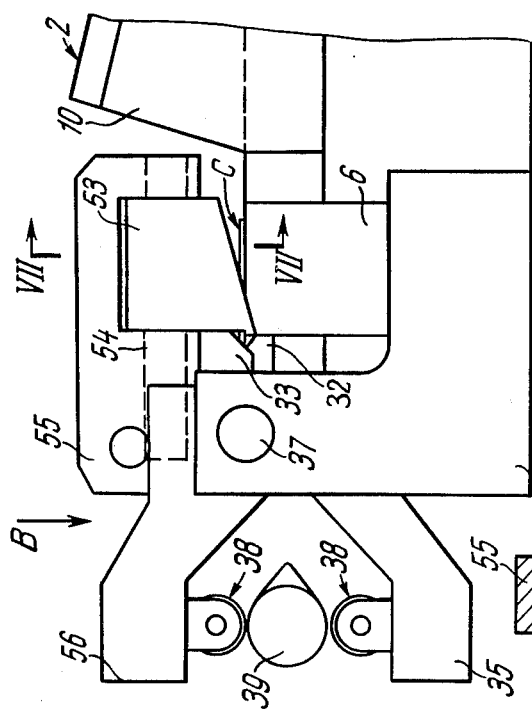
FIG. 6 is a view along arrow A in FIG. 1, turned through 90°, enlarged, the other knife is mounted on the on the second arm.
Figure 7:
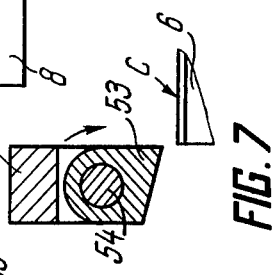
FIG. 7 is a section view taken along section line VII—VII in FIG. 6.

For automatic setting of the other knife 53 (FIGS. 6,7) to the initial position before cutting off the saw "C," the knife is secured on its own axle 54. The other knife 53 is fastened on the axle 54 so that its cutting lip is parallel with the axle. The axle 54 is mounted in the bracket 55 (FIGS. 6,7,8) which is rigidly secured on the end of the second arm 56 which carries the tooth-setting tool 33. The kinematic chain connecting the other knife 53 with the second arm 56 comprises a gear 57 (FIG. 9) mounted on the axle 54 of the other knife 53 and a rack 58 (FIG. 9) meshing with the gear 57, the rack being made on the rod 59. The rod 59 is installed in the bracket 55 with a provision for being positively reciprocated. The other knife 53 is turned to the initial position before cutting off the saw on the command of a set-tooth counting transmitter (not shown) by a pusher 60 acting on the end of the rod 59. The opposite end of the rod 59 is loaded by a spring 61 which returns the rod 59 and, consequently, the other knife 53 to the neutral position after cutting off the saw "C". In this embodiment the fixed knife 6 is secured on the base 8 (FIG. 2) of the saw gripping device 2.

The transmitter utilized for counting the number of set teeth can be of any type suitable for this purpose.

When cutting off saws of a comparatively large width (40–60 mm) and thickness (1–1.3 mm) the other knife 62 (FIG. 10) is secured on its axle 63 so that its cutting lip is essentially perpendicular to this axle. The other knife 62 is installed in the bracket 64 fastened on the end of the second arm 65 which carries the tooth setting tool 33. The axle 63 is loaded relative to the bracket 64 by a spring 66 which holds the knife 62 in a neutral position.

The kinematic chain connecting the other knife 62 with the second arm 65 is made in the form of a wedge joint. One of the wedge surfaces 67 is made on the axle 63 at an angle to its geometrical axis while the other wedge surface 68 is made on the part 69 installed in the bracket 64 with a provision for being positively reciprocated. The part 69 passes through a hole 70 in the axle 63. To set the other knife 62 to the initial position before cutting off the saw "C," the pusher 71 receives a command of the set-tooth counting transmitter (not shown) and moves the part 69 over the surface 67 made on the axle 63. The saw being cut-off, the part 69 and the other knife 62 are returned by the spring 66 to the neutral position.

In the next embodiment of the invention the kinematic chain connecting the other knife 72 (FIG. 11) with the second arm 73 comprises a gear rack 74 made on the surface of the other knife 72 opposite to its cutting lip, and a gear 75 mounted on a shaft 76 which is installed in a bracket 77, the latter being rigidly secured on the second arm 73. The shaft 76 is turned for setting the other knife 72 to the initial position before cutting off the saw or saw blade "C" on a command from the set-tooth counting transmitter (not shown) by an independent drive of any conventional design suitable for this purpose (the drive is not shown so as not to obscure the substance of the invention). The same independent drive returns the other knife 72 to the neutral position.

In the kinematic linkage of this type the saw tooth space is oriented with respect to the other knife so that the saw is cut off always at a preset point.

Figure 10:
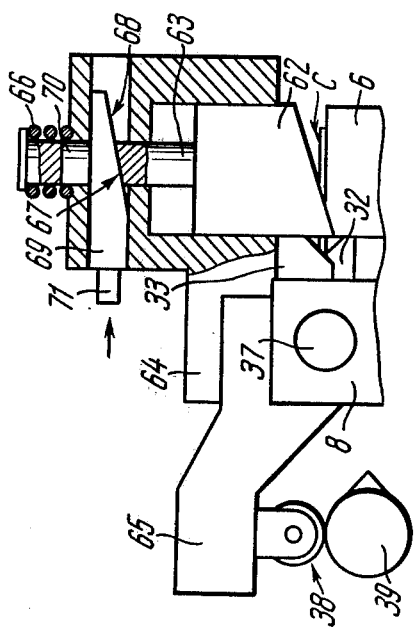

In the next embodiment of the invention described known the kinematic chain connecting the other knife 78 (FIG. 12) with the second arm 79 which carries the tooth-setting tool 33 comprises an additional arm 80 and a wedge joint 81 which is similar to the wedge joint illustrated in FIG. 10 and described above. The end of the additional arm 80 carries the other knife 78 and the turning axle of this knife 78 is installed in a bracket 83 which is rigidly secured on the end of the second arm 79 carrying the tooth-setting tool 33. The axle 82 is arranged parallel to the pitch feed of the saw "C." One of the wedge surfaces is located on the additional arm 80 and the other one, on the wedge 84 which is installed in the bracket 83 with a provision for reciprocating motion. Before cutting off the saw "C" the other knife 78 is set to the initial position by the pusher 71 (FIG. 10) on a command of the set-tooth counting transmitter (not shown). A spring 85 located between the bracket 83 and the additional arm 80 returns the additional arm 80 (FIG. 12) and, as a consequence, the other knife 78 to the neutral position after cutting off the saw "C." Secured on the bracket 83 is a stop 86 intended to limit the travel of the additional arm 80. The kinematic linkage of this kind is especially suitable for cutting off comparatively wide saws.

If a saw is comparatively thick (1.3 mm), the cutting force can be reduced by connecting the part 84 via the pusher 71 (FIG. 10) to an independent drive (not shown) for vibrating said part.

In the following embodiment of the invention described herein the other knife 87 (FIG. 13) is made integral with an additional arm 88 whose turning axle 89 is installed in a bracket 90 secured on the second arm 91 which carries the tooth-setting tool.

The axle 89 is perpendicular to the pitch feed. The end of the additional arm 88 carrying the other knife 87 is loaded with a spring 92 located between the additional arm 88 and the base 8 of the saw gripping device 2. The spring returns the other knife 87 to the neutral position after cutting off the saw. The other knife 87 is set to the initial position before cutting by a pusher 93 installed on the second arm 91 and actuated by a command of the set-tooth counting transmitter (not shown). This is the simplest type of kinematic linkage.

If the band saws are comparatively narrow, the otherknife 94 (FIG. 14) is secured on the face of a cylinder 95. The other end of the cylinder is located in a bracket 96 which is secured in the second arm 97 with a provision for turning around its own geometrical axis. Fastened to the cylinder 95 is a drive link 98 connected with an independent drive and actuated by the set-tooth counting transmitter (not shown) for turning the knife 94 to the initial position before cutting off the saw blade "C." The cylinder 95 is locked in the axial direction with respect to the bracket 96 by an axle 99 secured on the bracket 96; the free end of said axle 99 enters a circular groove located on the external surface of the cylinder 95.

Figures 14, 15:
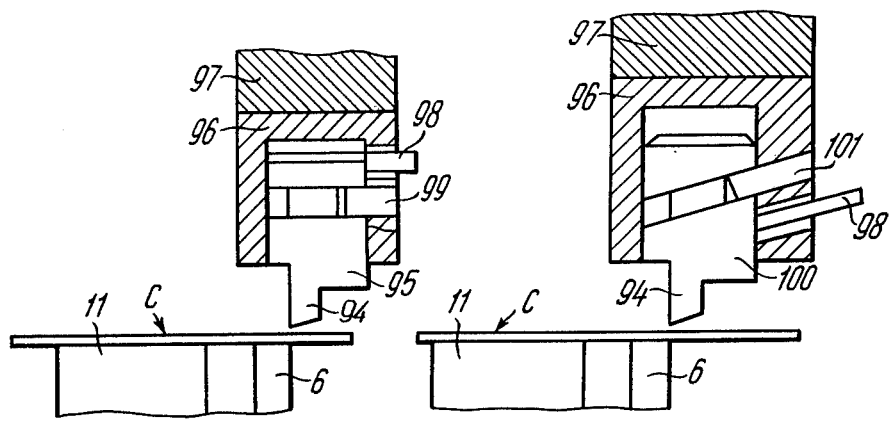

In the embodiment of the invention illustrated in FIG. 15 the kinematic linkage of the other knife 94 with the second arm 97 is fundamentally similar to the linkage shown in FIG. 14 with the sole exception that the groove on the part 100 receiving the axle 101 intended to lock this part is of a helical shape. This shape of the groove ensures limited displacement of the other knife 94 and its comparatively fast returning to the neutral position after cutting off the saw blade "C" and before the pitch feed of the saw.

For manual setting of the machine there is provided a hand wheel 102 (FIG. 1).

The machine for mechanical working of band saws functions as follows.

In order to set the teeth of the saw "C" the first step is to adjust the master form 30 to the desired pitch feed of the saw "C." Then the hold-down 13a (FIG. 2) is lifted to a height which is larger than the thickness of the saw blade "C" for which purpose the retainer 14 is screwed out somewhat, then the retainers 24 and 25 are lifted, the handle 26 is turned back and the cover 10 is shifted to the rearmost position. The saw "C" is laid on the guide 11, and the supporting element 17 is moved backward (to the left in the drawing). Then, due to actuation by the spring 23, the supporting element 17 feeds the saw until the points of its teeth come in contact with the working surfaces of the supporting elements 18 and 19. Now the cover 10 is shifted onto the saw "C" and is automatically fixed in position by the retainer 25. The position of the supporting element 17 is fixed by clamping the shaft 21 with the retainer 24. The cover 10 is clamped by the handle 26. The saw "C" is pressed by the hold-down 13a but is still capable of sliding with a certain drag between the guides 11 and 12. The pawl 28 is set so that the teeth to be set are located in the middle of the working surfaces of the bending punches 32 and 33. Having positioned and clamped the saw, the reduction unit 4 is turned on and the required number of saw teeth is set. Simultaneously with setting the last tooth, the saw blade is cut off. Before setting the last tooth of the saw "C" the reduction unit 4 is turned off and the other knife 7 is brought to the initial position for which purpose said other knife 7 is turned by the handle 46 relative to the axle 37 so that the surface of the wedge 44 comes in contact with a surface "e" of the stop 42. As the other knife is being turned, it slides over the slant of the face surface 47. Moving, the stop 42 compresses the spring 45. Then the spring 45 returns the stop 42 and its surface "e" comes in contact with the other knife 7. Thus, the other knife 7 comes to the initial position, forming a rigid system with the arm 36.

Now the reduction unit is engaged, the rotating shaft 31 turns the cam 39 which acts on the second arm 36. The turning second arm 36 sets the last tooth of the saw by the bending punch 33 and simultaneously cuts off the saw blade because the other knife 7 turns together with the arm 36 and cuts off the saw blade jointly with the knife 6. After cutting off the saw blade the other knife 7 turns further along the direction shown by arrow "E" in FIG. 3 and drops down, thus leaving the cutting zone before the pitch feed of the saw and coming to the neutral position. Then the reduction unit 4 is either turned off or the saw teeth continue to be set if setting is carried out directly from a roll.

Before cutting off, the saw "C" can be pressed somewhat by the retainer 14.

In case of kinematic linkage between the other knife 48 and the first arm 49 the saw blade is cut off basically as described above.

In another embodiment of the kinematic linkage, illustrated in FIGS. 6 through 9, the other knife 53 is automatically brought to the initial position on a signal of the set-tooth counting transmitter at the moment of setting the last tooth of the saw. On receiving this signal, the pusher moves and acts on the end of the rod 59, shifting it downwards (in the drawing), and compresses the spring 61. Meanwhile, the rack 58 turns the gear 57 and with it, the other knife 53, bringing it to the initial position, i.e. facing the knife 6. Then, as the second arm 56 turns, the blade of the saw "C" is cut off simultaneously with setting of the last tooth. After cutting off, the pusher 60 is relieved, and the rod 59 is moved back by the spring 61 (upwards in the drawing), turning the gear 57 in the opposite direction and, together with it, the other knife 53 secured on the axle 54, thus withdrawing said knife from the cutting zone to the neutral position before the saw is fed along the pitch feed direction.

In the embodiment of the machine illustrated in FIG. 10 the other knife 62 is brought to the initial position on a signal from the set-tooth counting transmitter. On this signal the pusher 71 moves the part 69 whose wedge surface 68 acts on the wedge surface 67 and the other knife 62 descends to the initial position in which case the spring 66 is stretched. As the second arm 65 turns, the saw blade is cut off by the knives 6 and 62 simultaneously with setting of the last tooth. After the cutting off, the pusher 71 is relieved of a load, and the other knife 62 is lifted by the spring 66 upward (in the drawing) and leaves the cutting zone and returns to the neutral position before the beginning of the pitch feed of the saw.

Figure 11:
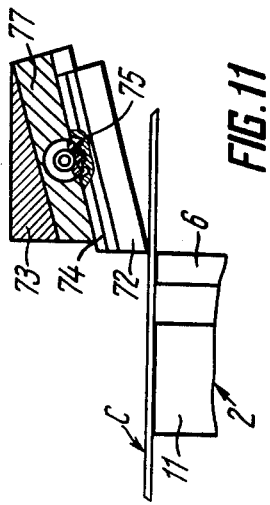

In an alternative embodiment of the invention shown in FIG. 11 the knife 72 is brought to the initial position on a signal sent from the set-tooth counting transmitter to the independent drive which, in turning the shaft 76, turns the gear 75 secured on said shaft. Meshing with the rack 74, the gear 75 moves the rack together with the other knife 72, bringing the latter to the initial position before cutting off the blade of the saw "C."

As the second arm 73 turns, the last tooth is set concurrently with the cutting off of the saw blade. The other knife 72 is returned to the neutral position from the same independent drive by the shaft 76 turning in the opposite direction.

Figure 12:
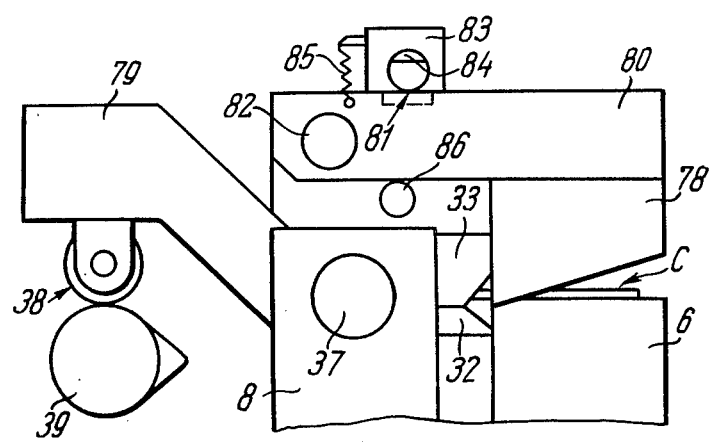

In the alternative embodiment shown in FIG. 12 the other knife 78 is brought to the initial position when the wedge 84 is moved on a signal from the set-tooth counting transmitter. Moving over the wedge surface of the additional arm 80, the wedge 84 forces it to turn on the axle 82 to the stop 86. Thus, the additional arm 80, the other knife 78 and the second arm 79 form a rigid system. As the cam 39 interacts with the second arm 79 the latter turns around the axle 37 and its bending punch 33 sets the last tooth while the knives 6 and 78 cut off the saw blade.

Then the spring 85 returns the additional arm 80 to the neutral position, the saw is fed along the pitch and the teeth of the next saw are set.

Figure 13:
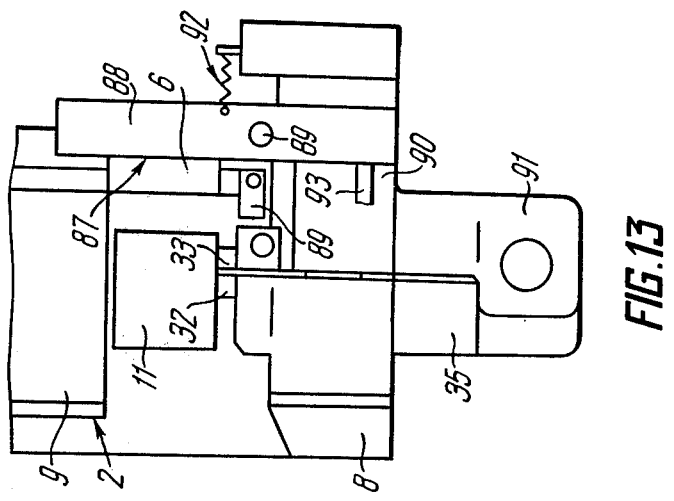
FIGS. 10 through 15 show different versions of the kinematic linkage between the other knife and the second arm.

In the alternative embodiment shown in FIG. 13 the saw blade is cut off just as it is described above.

In the embodiment illustrated in FIGS. 14 and 15 the other knife 94 is brought to the initial position on a signal from the set-tooth counting transmitter. After the last tooth has been set, the drive link 98 receives a signal from the transmitter and turns the part 95 (100) so that the other knife 94 comes to face the knife 6 and is fixed against axial displacement by the axle 99 (101). Interacting with the cam 39, the second arm 97 turns for setting the last tooth; simultaneously, the other knife 94 turns and cuts off the saw blade.

Before the saw "C" is fed along the pitch, the drive link 98 is turned in the opposite direction and the other knife 94 is brought to the neutral position, i.e. withdrawn from the cutting zone, and the next saw is fed in along the feed direction for setting its teeth.

What is claimed is:

1. Apparatus for setting teeth of band saw blades and cutting thereof, means for advancing a band saw blade longitudinally, a tooth-setting device comprising two pivotally mounted arms having tooth-setting tools thereon, pivot means pivotally mounting said two arms, means for actuating said arms to effect setting of the teeth on said band saw blade, a pair of knives disposed downstream of said tooth setting device for cutting said blade after the teeth thereof have been set, means mounting one of said knives stationary, said pivot means pivotally mounting the other knife of said two knives, means to render said other knife effective when a given number of teeth on a corresponding length of said blade have been set, actuating means on one of said arms for actuating said other knife when rendered effective to cooperate with the stationary knife to effect cutting of said band saw blade.

2. Apparatus for setting teeth of band saw blades and cutting thereof according to claim 1, in which said actuating means comprises a stop.

3. Apparatus for setting teeth of band saw blades according to claim 1, in which said means to render said other knife effective comprises a handle for rotating said other knife to a cutting position and to move it out of said cutting position.

4. Apparatus for setting teeth of band saw blades and cutting thereof according to claim 1, in which said actuating means comprises a stop for driving said other knife, means resiliently biasing said stop to a position for driving said other knife and allowing retraction of said stop.

* * * * *